United States Patent
Ito

(10) Patent No.: US 11,163,785 B2
(45) Date of Patent: Nov. 2, 2021

(54) DOCUMENT SEARCH RESULT PRESENTATION APPARATUS AND NON-TRANSITORY COMPUTER READABLE MEDIUM

(71) Applicant: FUJIFILM Business Innovation Corp., Tokyo (JP)

(72) Inventor: Yasuhiro Ito, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/556,173

(22) Filed: Aug. 29, 2019

(65) Prior Publication Data
US 2020/0301914 A1    Sep. 24, 2020

(30) Foreign Application Priority Data

Mar. 19, 2019    (JP) .............................. JP2019-051740

(51) Int. Cl.
| | | |
|---|---|---|
| *G06F 3/048* | (2013.01) | |
| *G06F 16/248* | (2019.01) | |
| *G06F 16/93* | (2019.01) | |
| *G06F 3/0484* | (2013.01) | |

(52) U.S. Cl.
CPC .......... *G06F 16/248* (2019.01); *G06F 3/0484* (2013.01); *G06F 16/93* (2019.01)

(58) Field of Classification Search
CPC ....... G06F 16/248; G06F 16/93; G06F 3/0484
See application file for complete search history.

(56) References Cited

U.S. PATENT DOCUMENTS

| | | | | |
|---|---|---|---|---|
| 8,484,578 B2* | 7/2013 | Gordner | .............. | G06F 3/04845 715/808 |
| 8,677,274 B2* | 3/2014 | Runov | .................. | G06F 16/248 715/816 |
| 8,856,096 B2* | 10/2014 | Marchisio | ............... | G06F 16/36 707/706 |
| 9,613,004 B2* | 4/2017 | Liang | ...................... | G06F 40/10 |
| 9,690,448 B2* | 6/2017 | Satterfield | ............. | G06F 3/0482 |
| 9,760,608 B2* | 9/2017 | Cavanagh | ........... | G06F 16/9535 |
| 2005/0289109 A1* | 12/2005 | Arrouye | .................. | G06F 16/38 |

(Continued)

FOREIGN PATENT DOCUMENTS

| | | |
|---|---|---|
| JP | 2002014970 | 1/2002 |
| JP | 2003316776 | 11/2003 |
| JP | 2017204064 | 11/2017 |

*Primary Examiner* — David Phantana-angkool
(74) *Attorney, Agent, or Firm* — JCIPRNET

(57) ABSTRACT

A document search result presentation apparatus includes a language ability information acquisition unit, a search term input unit, and a document search result presentation unit. The language ability information acquisition unit is configured to acquire information indicating a language ability of a searcher. The search term input unit is configured to receive a search term. The document search result presentation unit is configured to present document search results acquired as a result of execution of a process of searching for a document that includes the search term received by the search term input unit, in a presentation format corresponding to the language ability of the searcher, which is indicated by the information acquired by the language ability information acquisition unit.

9 Claims, 16 Drawing Sheets

(56) References Cited

U.S. PATENT DOCUMENTS

| | | | |
|---|---|---|---|
| 2011/0238682 A1* | 9/2011 | Ootaki | G06F 16/93 |
| | | | 707/758 |
| 2012/0123764 A1* | 5/2012 | Ito | G06F 9/5055 |
| | | | 703/21 |
| 2015/0127674 A1* | 5/2015 | Ito | G06F 3/0482 |
| | | | 707/758 |
| 2015/0294377 A1* | 10/2015 | Chow | G06Q 30/0282 |
| | | | 705/347 |
| 2018/0253417 A1* | 9/2018 | Tanaka | G06F 40/284 |
| 2019/0361939 A1* | 11/2019 | Ito | G06F 16/9035 |
| 2020/0050695 A1* | 2/2020 | Benjamin | G06F 16/9038 |
| 2020/0257849 A1* | 8/2020 | Garg | G06F 16/248 |
| 2020/0301952 A1* | 9/2020 | Ito | G06F 16/93 |

\* cited by examiner

| 名前 |
|---|
| 🗎 緊急連絡体制表 |
| 🗎 建設業退職金共済制度加入届統一7 |
| 🗎 工事着手届統一1 |
| 🗎 前払金等請求確認書統一5 |
| 🗎 下請届統一8 |

| 名前 |
|---|
| 🗎 認定請求書統一11 |
| 🗎 記録の報告書統一28 |
| 🗎 発生剤報告内訳書統一15 |
| 🗎 材料検査請求書統一20 |
| 🗎 施工計画書統一22 |
| 🗎 支給材料(請求・受領・返納)内訳書統一13 |
| 🗎 承諾申請書統一25 |
| 🗎 承諾書統一17 |
| 🗎 工事状況報告書 |
| 🗎 変更届 |
| 🗎 主要資材発注予定報告書統一18 |
| 🗎 中間検査請求書統一21 |
| 🗎 [請求・通知・報告・協議]書統一16 |
| 🗎 [協議・報告]書統一26 |

FIG.9A
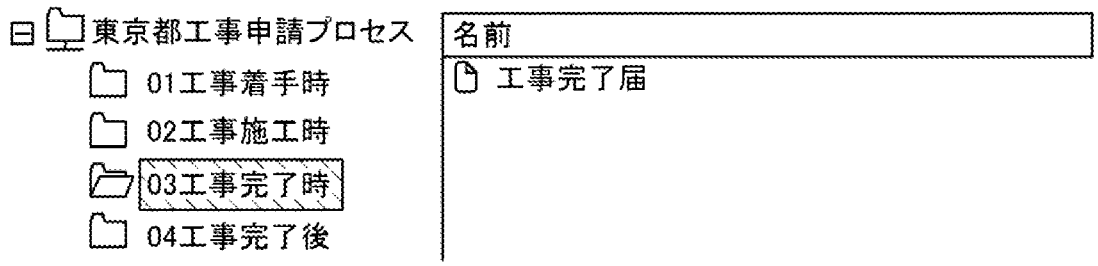
FIG.9B
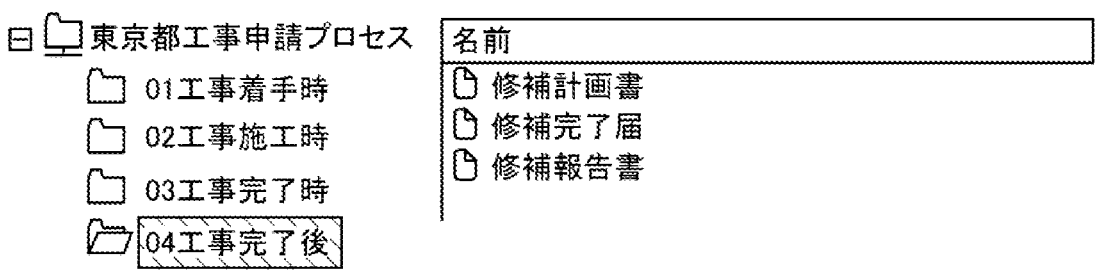
FIG.10
| 着手 | 施工 | 完了時 | 完了後 | 業務固有単語 |
|---|---|---|---|---|
| 工事 | 工事 | 工事 | 計画 | 施工 |
| 統一 | 統一 | 完了 | 完了 | 修繕 |
| 届 | 届 | 届 | 報告 | 工事 |
|  | 報告 |  | 届 | 検査 |
|  |  |  |  |  |
|  |  |  |  |  |

FIG.13

| PASSING GRADE | ASSISTANCE |
|---|---|
| FIRST GRADE | NO ASSISTANCE |
| PRE-FIRST GRADE | FURIGANA IS GIVEN TO KANJI CHARACTERS THAT ARE NOT COVERED BY GRADES LOWER THAN FIRST GRADE |
| SECOND GRADE | FURIGANA IS GIVEN TO KANJI CHARACTERS THAT ARE NOT COVERED BY GRADES LOWER THAN SECOND GRADE |
| PRE-SECOND GRADE | FURIGANA IS GIVEN TO KANJI CHARACTERS THAT ARE NOT COVERED BY GRADES LOWER THAN SECOND GRADE |
| THIRD GRADE | FURIGANA IS GIVEN TO KANJI CHARACTERS THAT ARE NOT COVERED BY GRADES LOWER THAN THIRD GRADE |
| PRE-THIRD GRADE | FURIGANA IS GIVEN TO KANJI CHARACTERS THAT ARE NOT COVERED BY GRADES LOWER THAN THIRD GRADE |
| FOURTH GRADE | FURIGANA IS GIVEN TO KANJI CHARACTERS THAT ARE NOT COVERED BY GRADES LOWER THAN FOURTH GRADE, AND EASY-TO-UNDERSTAND JAPANESE |
| PRE-FOURTH GRADE | FURIGANA IS GIVEN TO KANJI CHARACTERS THAT ARE NOT COVERED BY GRADES LOWER THAN FIFTH GRADE, AND EASY-TO-UNDERSTAND JAPANESE |

FIG.14

| HONORIFIC | GRAMMAR | VOCABULARY | MEANING OF WORDS | NOTATION | KANJI CHARACTERS | ASSISTANCE |
|---|---|---|---|---|---|---|
| ○ | ○ | ○ | ○ | ○ | ○ | CORRECT JAPANESE GRAMMAR |
| ○ | ○ | × | ○ | ○ | × | EASY-TO-UNDERSTAND JAPANESE |
| ○ | × | ○ | ○ | × | ○ | SUMMARY DISPLAY AND EASY-TO-UNDERSTAND JAPANESE |
| ○ | × | × | ○ | × | × | HIRAGANA CHARACTERS, FURIGANA, AND EASY-TO-UNDERSTAND JAPANESE |
| × | ○ | ○ | × | ○ | ○ | EASY-TO-UNDERSTAND JAPANESE |
| × | ○ | × | × | ○ | × | HIRAGANA CHARACTERS AND EASY-TO-UNDERSTAND JAPANESE |
| × | × | ○ | × | × | ○ | CONVERT INTO NATIVE LANGUAGE AND CONVERT INTO ROMAN CHARACTERS |
| × | × | × | × | × | × | CONVERT INTO NATIVE LANGUAGE AND CONVERT INTO ROMAN CHARACTERS |

FIG.15
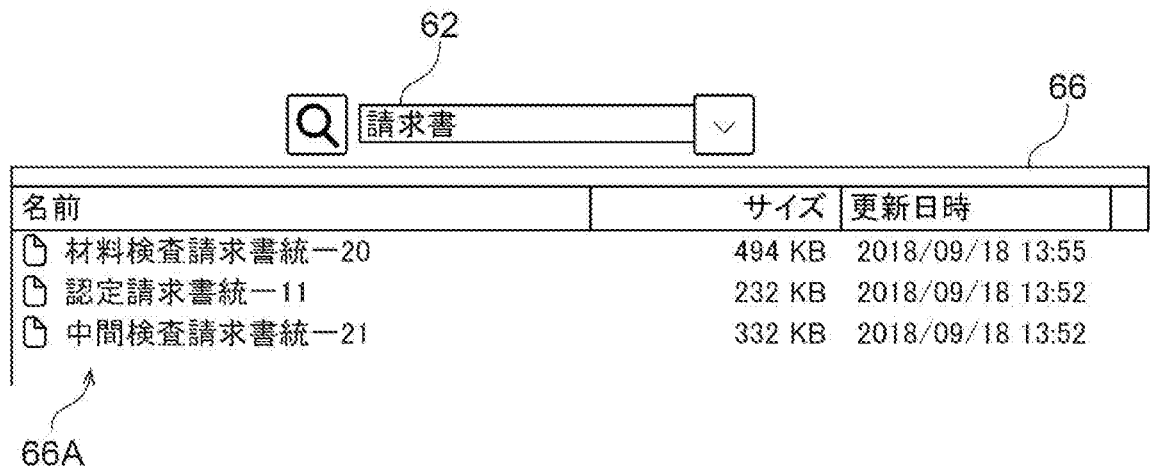
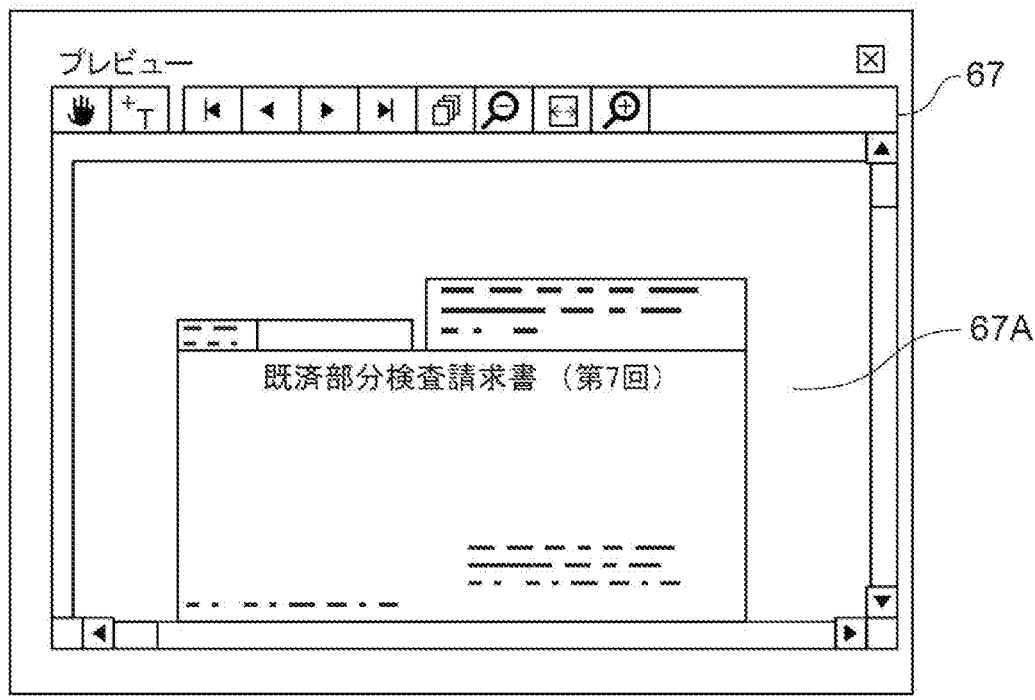

FIG.17A

<table>
<tr><td colspan="4">🔍 請求書 ▽    62</td></tr>
<tr><td colspan="4">66</td></tr>
<tr><td>名前</td><td></td><td>サイズ</td><td>更新日時</td></tr>
<tr><td>📄 (ざいりょうけんさせいきゅうしょ)材料検査請求書統一20</td><td></td><td>494 KB</td><td>2018/09/18 13:55</td></tr>
<tr><td>📄 (にんていせいきゅうしょ)認定請求書統一11</td><td></td><td>232 KB</td><td>2018/09/18 13:52</td></tr>
<tr><td>📄 (ちゅうかんけんさせいきゅうしょ)中間検査請求書統一21</td><td></td><td>332 KB</td><td>2018/09/18 13:52</td></tr>
</table>

<table>
<tr><td colspan="4">🔍 請求書 ▽    62</td></tr>
<tr><td colspan="4">66</td></tr>
<tr><td>名前</td><td></td><td>サイズ</td><td>更新日時</td></tr>
<tr><td>📄 中間けんさせいきゅう書とういつ21</td><td></td><td>512 KB</td><td>2018/09/18 14:23</td></tr>
</table>

<table>
<tr><td colspan="4">🔍 請求書 ▽    62</td></tr>
<tr><td colspan="4">66</td></tr>
<tr><td>名前</td><td></td><td>サイズ</td><td>更新日時</td></tr>
<tr><td>📄 CHUUKANSEIKYUUSHOTOUITSU21</td><td></td><td>94 KB</td><td>2018/09/18 13:53</td></tr>
</table>

| 日本語検定2級 (68A) | 日本語検定3級 (68B) | 日本語検定4級 (68C) |
|---|---|---|
| 「書」検索結果 | | |
| 中間検査せいきゅう書統一21<br>変更届書<br>[せいきゅう・通知・報告・きょうぎ]書統一16 | | |

| ひらがな (68D) | カタカナ (68E) | Roma (68F) |
|---|---|---|
| 「書」検索結果 | | |
| チュウカンセイキュウショトウイツ21 🔊<br>ヘンコウトドケ 🔊<br>[セイキュウ・ツウチ・ホウコク・キョウギ]ショトウイツ16 🔊 | | |

| 「書」検索結果 |
|---|
| 中間検査請求書統一21<br>変更届書<br>[請求・通知・報告・協議]書統一16 |

~67

DOCUMENT SEARCH RESULT PRESENTATION APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-051740 filed Mar. 19, 2019.

BACKGROUND (i) Technical Field

The present disclosure relates to an apparatus and a non-transitory computer readable medium that presents document search results.

(ii) Related Art

JP-A-2017-204064 relates to apparatus for assisting users to read Japanese texts. JP-A-2017-204064 describes selecting a term difficulty level and displaying a translated term corresponding to a term having the selected difficulty level from among terms in a Japanese original text.

SUMMARY

When a searcher, such as a foreign resident, who does not a high language ability searches a document using a document search apparatus, it may be difficult for him/her to select a target document from document search results.

Aspects of non-limiting embodiments of the present disclosure relate to a document search result presentation apparatus and a non-transitory computer readable medium that assists a searcher who does not have a high language ability to select a target document from document search results.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a document search result presentation apparatus including: a language ability information acquisition unit configured to acquire information indicating a language ability of a searcher; a search term input unit configured to receive a search term; and a document search result presentation unit configured to present document search results acquired as a result of execution of a process of searching for a document that includes the search term received by the search term input unit, in a presentation format corresponding to the language ability of the searcher, which is indicated by the information acquired by the language ability information acquisition unit.

BRIEF DESCRIPTION OF THE DRAWINGS

Exemplary embodiment(s) of the present disclosure will be described in detail based on the following figures, wherein:

FIGS. 8A and 8B are views each of which illustrates the document search results in each of a process at a time of construction start and a process at a time of construction execution, on a work;

FIGS. 9A and 9B are views each illustrating the document search results in each of a process at a time of construction completion and a process after construction completion, on the work;

FIG. 10 is a view illustrating technical terms defined in the process at the time of construction start, the process at the time of construction execution, the process at the time of construction completion, and the process after the construction completion, together with work-specific terms;

FIG. 13 is a view illustrating a relationship between a Japanese language test passing grade and assistance in relation to the document search results;

FIG. 14 is a view illustrating a relationship between items determined in a Japanese language test, and the assistance in relation to the document search results;

FIG. 15 is a view illustrating an example in which the document search results are displayed on the display screen in a display format corresponding to the highest language ability;

FIGS. 17A to 17C are views each illustrating an example in which the document search results are displayed on the display screen of the display device in a display format corresponding to the language ability of the searcher;

FIGS. 18A to 18C are views each illustrating an example in which the document search results are presented according to a selection of the language ability.

DETAILED DESCRIPTION

Figure 1:
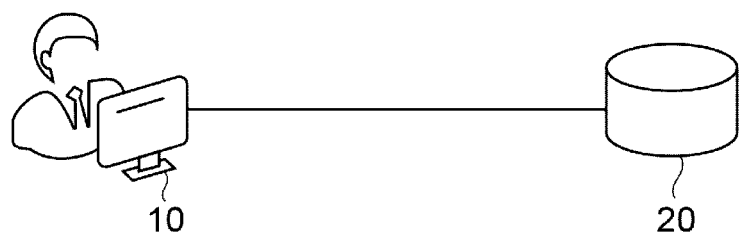
FIG. 1 is a view illustrating a configuration according to an exemplary embodiment of a technology of the present disclosure.

Hereinafter, an example of an exemplary embodiment of a technology of the present disclosure will be described with reference to the accompanying drawings. In the respective drawings, the same or equivalent elements and portions are given the same reference numerals. Further, the dimensional proportions in the drawings are exaggerated for the convenience of description and may be different from actual proportions.

FIG. 1 is a view illustrating a configuration according to an exemplary embodiment of a technology of the present disclosure.

As illustrated in FIG. 1, a document search result presentation apparatus 10 is implemented by, for example, a user terminal device. The document search result presentation apparatus 10 is connected to a database 20 and is able to communicate with the database 20. The document search result presentation apparatus 10 assists a user who needs to search in a language other than a native language such that the user can select a target document from document search results when searching data stored in the database 20.

Figure 2:
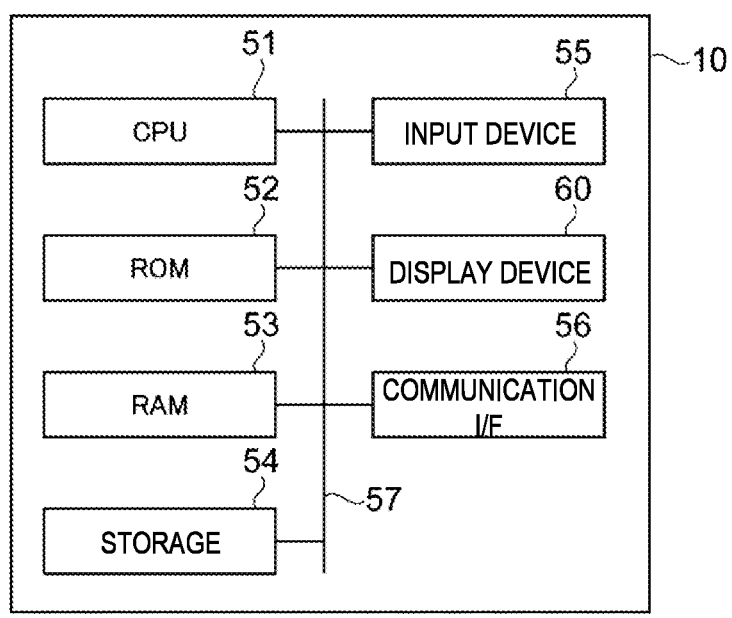
FIG. 2 is a block diagram illustrating a hardware configuration of a document search result presentation apparatus.

FIG. 2 is a block diagram illustrating a hardware configuration of the document search result presentation apparatus 10.

As illustrated in FIG. 2, the document search result presentation apparatus 10 includes components such as a central processing unit (CPU) 51, a read only memory (ROM) 52, a random access memory (RAM) 53, a storage 54, an input device 55, a display device 60, and a communication interface (communication I/F) 56. The components are connected to communicate with each other via a bus 57.

The CPU 51 is a central arithmetic processing unit, and executes various programs and controls the respective units. That is, the CPU 51 reads a program from the ROM 52 or the storage 54, and executes the program using the RAM 53 as a work area. The CPU 51 controls the components described above and performs various arithmetic processes according to the program stored in the ROM 52 or the storage 54. In the present exemplary embodiment, a document search result presentation program is stored in the ROM 52 or the storage 54.

The ROM 52 stores various programs and various data. The RAM 53 serves as a work area and temporarily stores programs or data. The storage 54 is implemented by a hard disk drive (HDD) or a solid state drive (SSD), and stores various programs including an operating system, and various data.

The input device 55 includes a pointing device such as a mouse, and a keyboard, and is used to perform various inputs. The display device 60 is, for example, a liquid crystal display, and displays various information. The display device 60 may function as the input device 55 by employing a touch panel type device.

The communication interface 56 is an interface for communicating with other devices such as the database 20, and employs standards such as, for example, Ethernet (registered trademark), FDDI, and Wi-Fi (registered trademark).

In a language ability information storage of the database 20, information indicating a Japanese language ability is stored in association with each user (each searcher).

In a work information storage of the database 20, work information is stored in association with each user (each searcher).

In a document storage of the database 20, documents to be searched are stored.

Next, functional components of the document search result presentation apparatus 10 will be described.

Figure 3:
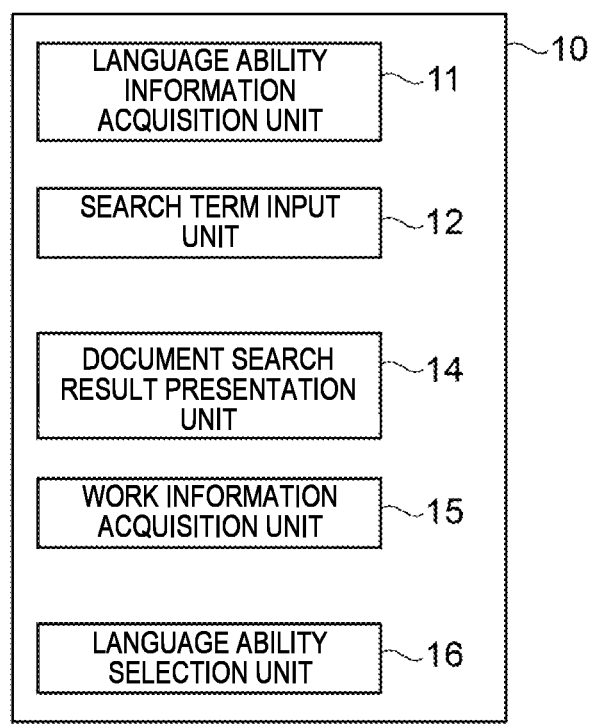
FIG. 3 is a block diagram illustrating an example of functional components of the document search result presentation apparatus.

FIG. 3 is a block diagram illustrating an example of the functional components of the document search result presentation apparatus 10.

As illustrated in FIG. 3, the document search result presentation apparatus 10 includes a language ability information acquisition unit 11, a search term input unit 12, a document search result presentation unit 14, a work information acquisition unit 15, and a language ability selection unit 16, as functional components.

Each functional component is implemented by the CPU 51 reading the document search result presentation program stored in the ROM 52 or the storage 54 and loading and executing the document search result presentation program on the RAM 53.

The process of the document search result presentation program may also be implemented by a dedicated hardware circuit. In this case, the document search result presentation program may be executed by a single hardware circuit or plural hardware circuits.

In addition, a program that operates the document search result presentation apparatus 10 may be provided by a computer-readable recording medium such as a universal serial bus (USB) memory, a flexible disc, or a compact disc read only memory (CD-ROM), or may be provided on-line via a network such as the Internet. In this case, the program recorded in the computer-readable recording medium is generally transmitted to a memory, a storage, or the like and is stored. In addition, the program may be provided as, for example, single application software, or may be embedded as one function of the document search result presentation apparatus 10 in software of the apparatus.

The respective elements of the document search result presentation apparatus 10 will be described below.

The language ability information acquisition unit 11 reads information indicating a language ability associated with a searcher from the language ability information storage of the database 20, and acquires the information indicating the language ability of the searcher.

A search term is input to the search term input unit 12 according to an input operation of the searcher. That is, the search teen input unit 12 receives the search term. When the search term is input to the search term input unit 12, a process of searching for a document including the search term is executed. As a result of the execution of the process of searching for the document including the search term, document search results are acquired.

The document search result presentation unit 14 presents the document search results in a presentation format corresponding to the language ability of the searcher, which is indicated by the information acquired by the language ability information acquisition unit 11.

Hereinafter, description will be made on an example in which "a display format of Japanese language is changed in a presentation format corresponding to a language ability of a searcher".

It should be noted that the following example is equivalent to that in the case of English, "display in a presentation format corresponding to a language ability of a searcher with changing a level of English words".

For example, when the searcher has the language ability at a level where one understands hiragana characters, the document search result presentation unit 14 converts a display format of the document search results from Kanji characters to hiragana characters and displays the document search results. For example, when the searcher has the language ability at a level where one understands Roman characters, the document search result presentation unit 14 converts the display format of the document search results from Kanji-Kana mixed to Roman characters and displays the document search results. For example, when the searcher has the language ability at a level where one understands easy-to-understand Japanese, the document search result presentation unit 14 converts the display format of the document search results into easy-to-understand Japanese and displays the document search results. The conversion into easy-to-understand Japanese refers to, for example, converting the display format of the document search results into hiragana characters, and adding a commentary on terms used in the document search results in hiragana characters.

Further, the document search result presentation unit 14 presents terms related to a work of the searcher, which is indicated by information acquired by the work information acquisition unit 15, among terms included in the document search results in a presentation format corresponding to a language ability higher than the language ability of the searcher, which is indicated by the information acquired by the language ability information acquisition unit 11. For example, even for a searcher having a low Japanese language ability, terms related to a work are displayed in a display format corresponding to the highest language ability (for example, Kanji characters).

Further, the document search result presentation unit 14 presents terms related to a past work of the searcher, which are indicated by the information acquired by the work information acquisition unit 15, among the terms included in the document search results in the presentation format corresponding to the language ability higher than the language ability of the searcher, which is indicated by the information acquired by the language ability information acquisition unit 11.

Further, the document search result presentation unit 14 presents the document search results such that the longer a time period for which the searcher is involved in a work is or the more the number of times the searcher experiences the work is, the more terms are presented in the presentation format corresponding to the language ability higher than the language ability of the searcher, which is indicated by the information acquired by the language ability information acquisition unit 11.

Further, the document search result presentation unit 14 presents terms related to a file stored by the searcher, which is indicated by the information acquired by the work information acquisition unit 15, among the terms included in the document search results in the presentation format corresponding to the language ability higher than the language ability of the searcher, which is indicated by the information acquired by the language ability information acquisition unit 11.

The work information acquisition unit 15 reads work information associated with the searcher from the work information storage of the database 20 and acquires the information indicating a work of the searcher. The information indicating the work of the searcher is information on a current work in which the searcher is involved, information on a past work in which the searcher is involved, a time period for which the searcher is involved in the work, the number of times the searcher experiences the work, information on the file stored by the searcher, and the like.

The language ability selection unit 16 selects the language ability of the searcher according to an operation of the searcher. That is, the language ability selection unit 16 receives a selection of the language ability by the searcher.

The document search result presentation unit 14 presents the document search results in the presentation format corresponding to the language ability of the searcher selected by the language ability selection unit 16.

(Acquire Information Indicating Language Ability)

An example of the language ability information acquisition unit 11 will be described below.

Figure 4A:
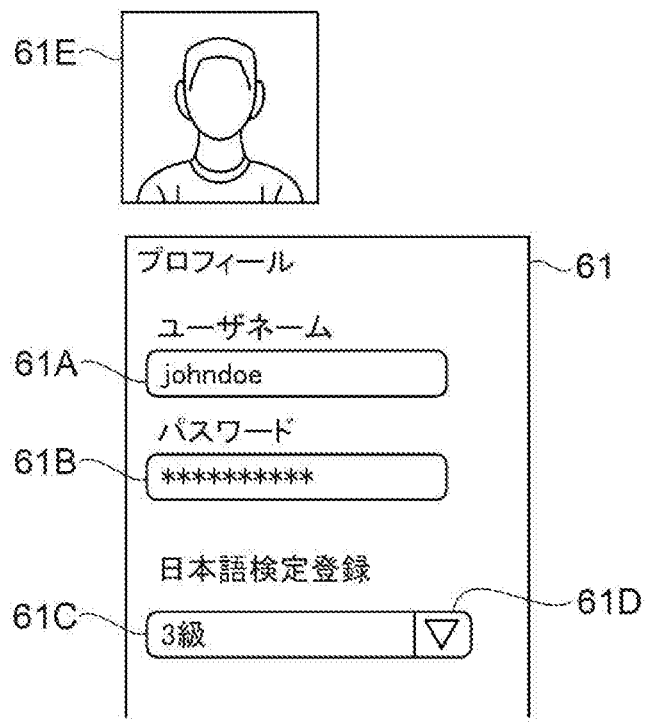
FIGS. 4A and 4B are views each illustrating an example of a screen through which information indicating a Japanese language ability of a searcher is registered, on a display screen of a display device.
Figure 4B:
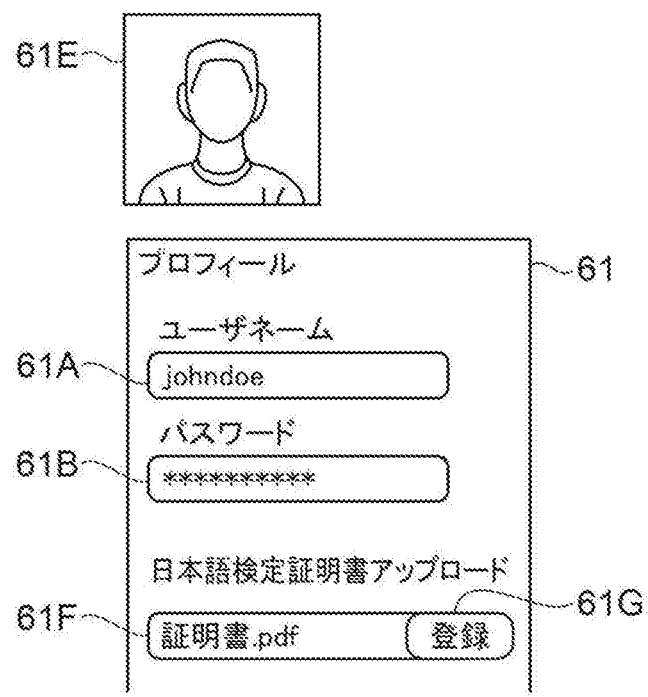
Figure 5:
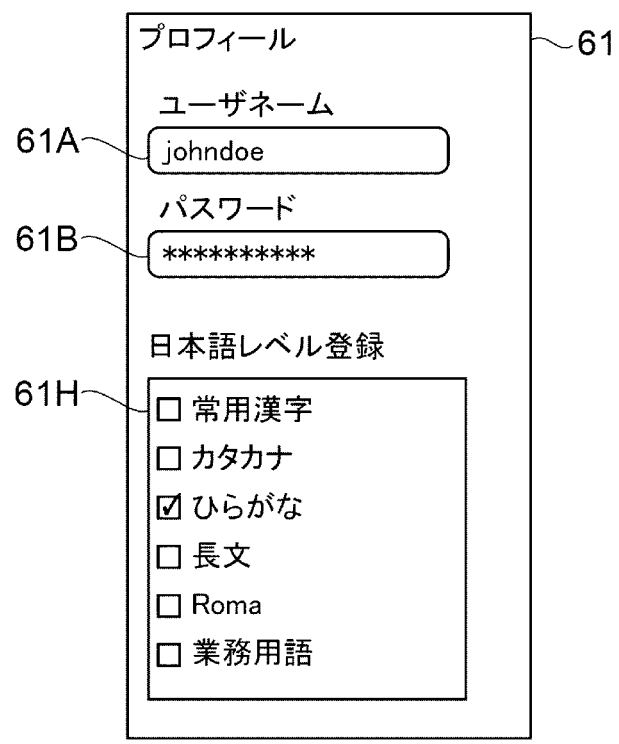
FIG. 5 is a view illustrating an example of a screen through which the information indicating the Japanese language ability of the searcher is registered, on the display screen of the display device.

Each of FIGS. 4A, 4B, and 5 illustrates an example of a configuration of screens through which information indicating the Japanese language ability of the searcher is registered, on a display screen of the display device 60.

FIG. 4A illustrates an example of a screen through which information indicating the Japanese language ability of the searcher is registered by performing an operation of inputting a Japanese language test passing grade of the searcher.

As illustrated in FIG. 4A, a user information registration screen 61 is provided on the display screen of the display device 60.

On the user information registration screen 61, a text box 61A for inputting a user name, a text box 61B for inputting a password, and a drop down box 61C for inputting a Japanese language test passing grade are arranged.

The searcher inputs a name of the searcher (for example, "johndoe"), as a user name, to the text box 61A. The searcher inputs a password of the searcher to the text box 61B. The searcher inputs the Japanese language test passing grade (for example, "3級") to the drop down box 61C. When an operation of instructing a mark 61D for displaying a drop down list is performed, a list of Japanese language test passing grades "1級", "準1級", "2級", "準2級", "3級", "準3級", "4級", and "準4級" is displayed as the drop down list. The searcher performs an operation of selecting his/her Japanese language test passing grade (for example, "3級") from the drop down list. Accordingly, the Japanese language test passing grade (for example, "3級") of the searcher is input to the drop down box 61C.

The input name (for example, "johndoe") of the searcher, the password of the searcher, and the Japanese language test passing grade (for example, "3級") of the searcher are stored in the language ability information storage of the database 20 in association with each other.

The language ability information acquisition unit 11 reads the information indicating the language ability (for example, the Japanese language test passing grade is "3級") associated with the searcher (for example, "johndoe") from the language ability information storage of the database 20, and acquires the information indicating the language ability (for example, the Japanese language test passing grade is "3級") of the searcher (for example, "johndoe").

In addition, a face photo input unit 61E may be provided on the display screen of the display device 60, and a process of registering the searcher (for example, "johndoe") in association with a face photo of the searcher may be performed.

The information indicating the Japanese language ability of the searcher may be registered by uploading a test result certificate of a Japanese language test, instead of inputting the Japanese language test passing grade.

FIG. 4B illustrates an example of a configuration of a screen through which the information indicating the Japanese language ability of the searcher is registered by performing an operation of uploading the test result certificate of the Japanese language test of the searcher.

The same elements as those in FIG. 4A will be denoted by the same reference numerals as those in FIG. 4A, and descriptions thereof will be omitted. Then, portions different from those in FIG. 4A will be described.

On the user information registration screen 61, a box 61F for uploading the test result certificate of the Japanese language test is provided.

The searcher inputs a file of the test result certificate of the Japanese language test (for example, "証明書.pdf"), to the box 61F. The file of the test result certificate of the Japanese language test may be selected from a drop down list, and then input. When the file of the test result certificate of the Japanese language test (for example, "証明書 .pdf") is input to the box 61F, the searcher performs an operation of pressing a button 61G for registering the file of the test result certificate of the Japanese language test.

Accordingly, the input name of the searcher (for example, "johndoe"), the password of the searcher, and information stored in the file of the test result certificate of the Japanese language test of the searcher (for example, the test result of the Japanese language test is "3 級") are stored in the language ability information storage of the database 20 in association with each other.

The language ability information acquisition unit 11 reads the information indicating the language ability (for example, the test result of the Japanese language test is "3級") associated with the searcher (for example, "johndoe") from the language ability information storage of the database 20, and acquires the information indicating the language ability (for example, the test result of the Japanese language test is "3級") of the searcher (for example, "johndoe").

The searcher may select his/her Japanese ability level among selection options, to thereby register the information indicating the Japanese language ability of the searcher.

FIG. 5 illustrates an example of a configuration of a screen through which the information indicating the Japanese language ability of the searcher is registered by the searcher performing an operation of selecting his Japanese ability level.

As illustrated in FIG. 5, the user information registration screen 61 is displayed on the display screen of the display device 60. The same elements as those in FIGS. 4A and 4B will be denoted by the same reference numerals as those in FIGS. 4A and 4B and descriptions thereof will be omitted. Then, portions different from those in FIGS. 4A and 4B will be described.

On the user information registration screen 61, a check box 61H for registering the Japanese ability level of the user (searcher) is provided.

The searcher performs an operation of giving a check to an item that he/she understands, among items " 常用漢字 ", " カタカナ ", " ひらがな ", " 長文 ", "Roma ( ローマ ) 字 )", and " 業務用語 " in the check box 61H. The searcher may perform an operation of giving checks to plural items.

For example, when the searcher determines that he/she is at a level where one understands " ひらがな ", a check is given to " ひらがな " in the check box 61H.

Accordingly, the input name of the searcher (for example, "johndoe"), the password of the searcher, and the Japanese ability level of the searcher (for example, "understand ' ひらがな '") are stored in the language ability information storage of the database 20 in association with each other.

The language ability information acquisition unit 11 reads the information indicating the language ability (for example, "understand ' ひらがな '") associated with the searcher (for example, "johndoe") from the language ability information storage of the database 20, and acquires the information indicating the language ability (for example, "understand ' ひらが な '") of the searcher (for example, "johndoe").

The Japanese language test result may be registered in detail. A language ability level may be registered for each of items, for example, "honorific", "grammar", "vocabulary", "meaning of words", "notation", and "Kanji characters".

As the information indicating the language ability, information on a speaking ability level, a writing ability level, and a listening ability level may be registered.

In addition, information indicating that the searcher is at a level where one understands a local language may be registered.

(Input Search Term and Select Assistance in Relation to Document Search Results)

An example of the search term input unit 12 and the language ability selection unit 16 will be described.

Figure 6A:
FIGS. 6A to 6C are views each illustrating an example of a search term input unit and illustrating that in inputting a search term, information indicating a language ability is input and assistance in relation to display of document search results is selected.

As illustrated in FIG. 6A, the search term input unit 12 includes a search box 62. A switch 63 is provided in the vicinity of the search box 62. The switch 63 constitutes the language ability selection unit 16. According to the ON/OFF operation of the switch 63, whether to provide assistance in relation to document search results is selected.

The switch 63 is a switch for selecting between (i) requiring the assistance in relation to display of the document search results (ON) and (ii) allowing the document search results to be displayed in a display format corresponding to the highest language ability without requiring the assistance in relation to display of the document search results (OFF).

The searcher performs an operation of inputting a search term to the search term input unit 12. In inputting a search teen to the search term input unit 12, when the searcher determines that his/her language ability is low and requires the assistance in relation to display of the document search results, he/she performs an operation of turning "ON" the switch 63.

In inputting a search term to the search term input unit 12, when the searcher determines that his/her language ability is high, does not require the assistance in relation to display of the document search results, and allows the search results to be displayed in the display format corresponding to the highest language ability, the searcher performs an operation of turning "OFF" the switch 63.

Figure 6B:

FIG. 6B illustrates an example of a configuration in which buttons 63A and 63B are provided in the vicinity of the search box 62. The button 63A is a button for selecting allowing the document search results to be displayed in the display format corresponding to the highest language ability without requiring the assistance in relation to display of the document search results. The button 63B is a button for selecting requiring the assistance in relation to display of the document search results. The buttons 63A and 63B constitute the language ability selection unit 16. According to the selection operation of the button 63B or 63A, whether to provide the assistance in relation to the document search results is selected.

In inputting a search term to the search teen input unit 12, when the searcher determines that his/her language ability is low and requires the assistance in relation to display of the document search results, the searcher selects the button 63B. In inputting a search term to the search term input unit 12, when the searcher determines that his/her language ability is high, does not require the assistance in relation to display of the document search results, and allows the document search results to be displayed in the display format corresponding to the highest language ability, the searcher selects the button 63A.

Figure 6C:

FIG. 6C illustrates an example of a configuration in which a check box 63C is provided in the vicinity of the search term input unit 12. The check box 63C constitutes the language ability selection unit 16. According to the checking operation of the check box 63C, an assistance level of the document search results is selected.

In inputting a search term to the search term input unit 12, the searcher performs an operation of giving a check to an item of a level that he/she understand among items " ひらが

な", "カタカナ", "やさしい日本語", and "Roma (ローマ字)" in the check box 63C. The searcher may perform an operation of giving checks to plural items.

When the searcher determines that he/she is at a level where one understands "ひら がな", the searcher gives a check to "ひらがな". When the searcher determines that he/she is at a level where one understands "カタカナ", the searcher gives a check to "カタカナ". When the searcher determines that he/she is at a level where one understands "やさしい日本 語", the searcher gives a check to "やさしい日本語". When the searcher determines that he/she is at a level where one understands "Roma (ローマ字)", the searcher gives a check to "Roma (ローマ字)".

Giving no check to the check box 63C is regarded as selecting displaying the document search results in the display format corresponding to the highest language ability.

As described above, according to the ON/OFF operation of the switch 63 illustrated in FIG. 6A, the selection operation of the buttons 63A and 63B illustrated in FIG. 6B, or the like, information on an assistance level of the document search results is input.

Further, according to the ON/OFF operation of the switch 63 illustrated in FIG. 6A, the selection operation of the buttons 63A and 63B illustrated in FIG. 6B, or the like, the information indicating the language ability is also registered.

The information indicating the language ability (for example, "the switch 63 is ON; the language ability is low") is stored in the language ability information storage of the database 20 in association with the input name of the searcher (for example, "johndoe") and the password of the searcher.

The language ability information acquisition unit 11 reads the information indicating the language ability (for example, "language ability is low") associated with the searcher (for example, "johndoe") from the language ability information storage of the database 20, and acquires the information indicating the language ability (for example, "language ability is low") of the searcher (for example, "johndoe").

(Acquire Information Indicating Work)

An example of the work information acquisition unit 15 will be described.

In the work information storage of the database 20, the work information is stored in association with each user (each searcher). The work information includes information on past works in which the searcher is involved (a history of works which are assigned to the searcher), information on a process of a work being currently performed by the searcher (information on the progress degree of a process being currently performed), technical terms defined in each process, work-specific terms, information on files stored in the past, a time period for which the searcher is involved in the work, the number of times the searcher experiences the work, and the like.

The work information is stored for each user in the work information storage of the database 20 by performing a process of registering the work information for each user on the display screen of the display device 60. Then, information indicating the work of the searcher is acquired by the work information acquisition unit 15 reading the work information associated with the searcher from the work information storage of the database 20.

Figure 7:
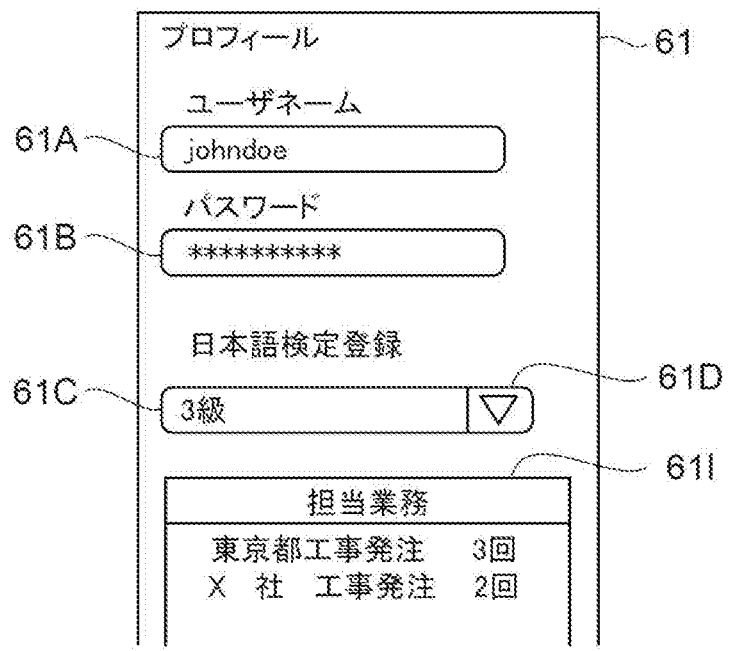
FIG. 7 is a view illustrating an example of a screen through which work information of the searcher is registered, on the display screen of the display device.

FIG. 7 illustrates an example of a screen through which the work information of the searcher is registered, on the display screen of the display device 60. The information on the past works in which the searcher is involved (the history of works which are assigned to the searcher) is registered as the work information of the searcher.

As illustrated in FIG. 7, the user information registration screen 61 is displayed on the display screen of the display device 60. The same elements as those in FIGS. 4A, 4B, and 5 will be denoted by the same reference numerals as those in FIGS. 4A, 4B, and 5, and descriptions thereof will be omitted. Then, portions different from those in FIGS. 4A, 4B, and 5 will be described.

The searcher inputs a history of works which are assigned to the searcher (for example, "東京都工事発注 3回", or "X 社工事発注 2回"), to a text box 61I for inputting a history of works which are assigned to the searcher.

The input name of the searcher (for example, "johndoe"), the password of the searcher, and the history of works which are assigned to the searcher (for example, "東京都工 事発注 3 回", or "X 社工事発注 2回") are stored in the work information storage of the database 20 in association with each other.

In this manner, the information on the number of time the searcher experiences the works is registered.

Likewise, the information on the time period for which the searcher is involved in the work may be registered on the display screen.

Next, descriptions will be made on an example in which technical terms defined in each process of a work and work-specific terms are registered.

Each of FIGS. 8A, 8B, 9A, and 9B illustrates document search results in each process at a time of construction start, at a time of construction execution, at a time of construction completion, and after construction completion, on a work that Tokyo construction application.

The database 20 stores documents in association with each process of the work. Therefore, as illustrated in FIGS. 8A, 8B, 9A, and 9B, when a process of the work is selected on a search screen, a list of documents related to the selected process is displayed on the display device 60.

FIG. 10 illustrates technical terms (frequently-appearing terms) defined in each of processes at the time of construction start, at the time of construction execution, at the time of construction completion, and after construction completion, together with the work-specific terms.

For example, at the time of construction start, "工事", "統一", and "届" are technical terms defined in the process. Further, "施工", "修繕", "工事", and "検査" are the work-specific terms.

Figure 11A:
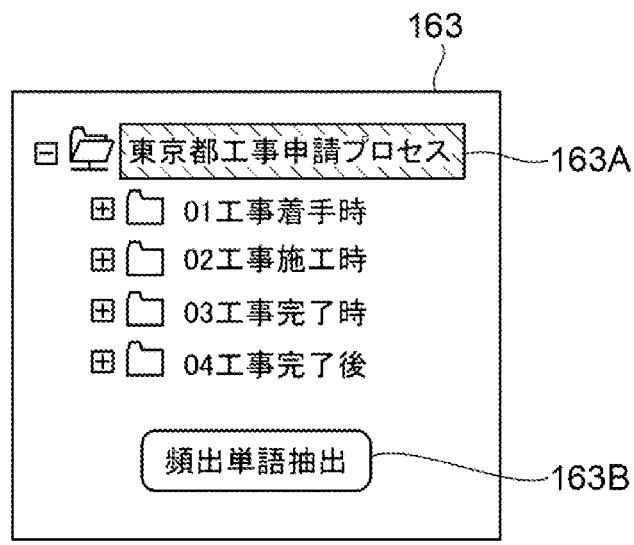
FIGS. 11A and 11B are views each illustrating an example in which the searcher (user) registers a technical term and a work-specific term.
Figure 11B:
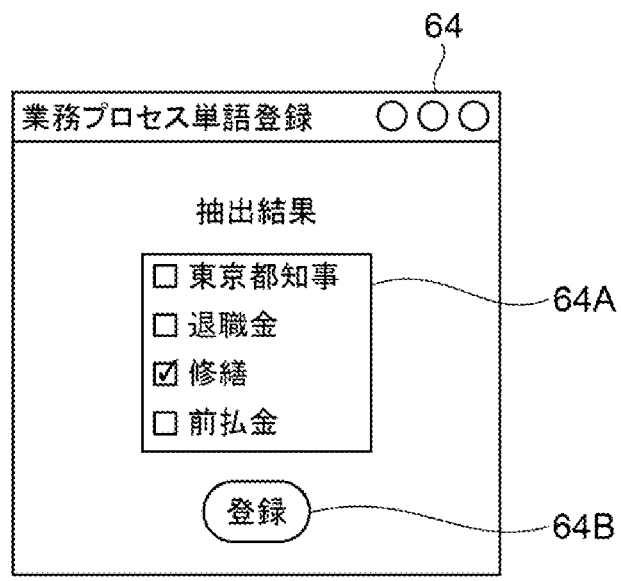

FIGS. 11A and 11B illustrate an example of a configuration in which the searcher (user) registers a technical term and a work-specific term.

As illustrated in FIG. 11A, a work process term registration screen 163 is displayed on the display screen of the display device 60.

On the work process term registration screen 163, each folder group that stores documents for each work and for each process of the each work is displayed, and further, a button 163B is displayed.

The searcher designates a desired folder (for example, a folder 163A of the work "東 京都工事申請プロセス"), and performs an operation of pressing the button 163B. Then, the display screen of the work process term registration screen 163 in FIG. 11A transitions to a work process term registration screen 64 illustrated in FIG. 11B.

Technical terms frequently appearing in documents stored in the designated folder (for example, the folder 163A of the work "東京都工事 申請プロセス") and work-specific terms (for example, terms specific to the work "東京都工事 申請プロセス") are extracted and displayed on the work process term registration screen 64. A check is given to a frequently-appearing term which the searcher wants to register (for example, "修繕") among the frequently-appearing terms displayed in a check box 64A, and an operation of pressing a button 64B is performed.

The searcher (user) may register technical terms and work-specific terms by performing an operation of inputting the technical terms and the work-specific terms on the display screen of the display device 60.

Figure 12:
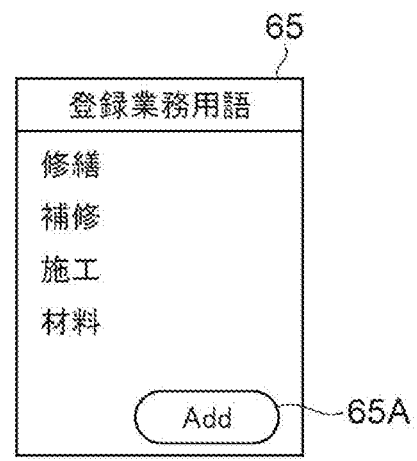
FIG. 12 is a view illustrating a text box displayed on the display screen of the display device.

As illustrated in FIG. 12, a text box 65 is displayed on the display screen of the display device 60.

The searcher (user) inputs technical terms and work-specific terms (for example, work-specific terms such as "修繕", "補修", "施工", and "材料") to the text box 65. Then, by performing an operation of pressing a button 65A, the terms may be registered.

The searcher may register terms used in a file name used in a past work.

For example, by performing an operation of designating a file illustrated in FIGS. 8A, 8B, 9A, and 9B, terms used in the designated file name may be registered as terms used in a past work.

As described above, the searcher performs the registration process on the display screen of the display device 60, so that the work information of the searcher is stored in the work information storage of the database 20.

The work information may be automatically stored in the work information storage of the database 20.

For example, by the searcher performing an operation of storing a file, terms used in the stored file name may be automatically registered.

(Present Document Search Results)

An example of the document search result presentation unit 14 will be described below.

The assistance in relation to the document search results according to the language ability of the searcher may be determined as in FIG. 13.

FIG. 13 illustrates a relationship between Japanese language test passing grades and assistance in relation to document search results.

When the Japanese language test passing grade of the searcher is a "first grade", no assistance is provided. The document search results are displayed in the display format corresponding to the highest language ability.

When the Japanese language test passing grade of the searcher is a "pre-first grade", the document search results are displayed in a display format in which Kanji characters that are not covered by grades lower than the first grade are given furigana. Furigana is hiragana characters indicating the pronunciation of Kanji characters.

When the Japanese language test passing grade of the searcher is a "second grade", the document search results are displayed in a display format in which Kanji characters that are not covered by grades lower than the second grade are given furigana.

When the Japanese language test passing grade of the searcher is a "pre-second grade", the document search results are displayed in a display format in which Kanji characters that are not covered by grades lower than the second grade are given furigana.

When the Japanese language test passing grade of the searcher is a "third grade", the document search results are displayed in a display format in which Kanji characters that are not covered by grades lower than the third grade are given furigana.

When the Japanese language test passing grade of the searcher is a "pre-third grade", the document search results are displayed in a display format in which Kanji characters that are not covered by grades lower than the third grade are given furigana.

When the Japanese language test passing grade of the searcher is a "fourth grade", the document search results are displayed in a display format in which the search results are converted into easy-to-understand Japanese and Kanji characters that are not covered by grades lower than the fourth grade are given furigana.

When the Japanese language test passing grade of the searcher is a "pre-fourth grade", the document search results are displayed in a display format in which the search results are converted into easy-to-understand Japanese and Kanji characters that are not covered by grades lower than a fifth grade are given furigana.

When the searcher is at a level where one understands a native language, the document search results may be displayed in a display format in which ruby in the native language is given.

FIG. 14 illustrates a relationship between items determined in the Japanese language test and the assistance in relation to the document search results.

For each of the items "honorific", "grammar", "vocabulary", "meaning of words", "notation", and "Kanji characters", an item for which it is determined in the Japanese language test that the searcher has a high language ability is given ○, and an item for which it is determined in the Japanese language test that the searcher has a low language ability is given x.

For example, when it is determined in the Japanese language test that the searcher has ○ in "honorific", x in "grammar", x in "vocabulary", ○ in "meaning of words", x in "notation", and x in "Kanji characters", the document search results are displayed in a display format in which the document search results are converted into hiragana characters, are given furigana, and converted into easy-to-understand Japanese.

FIG. 15 illustrates an example in which document search results are displayed on the display screen of the display device 60 in the display format corresponding to the highest language ability (understand Kanji characters).

When a search term "請求書" is input to the search box 62, documents including the search term "請求書" are searched for in the document storage of the database 20 and are displayed on a document search result display unit 66 in the display format corresponding to the highest language ability (Kanji characters).

When an operation of selecting a target document 66A is performed on the document search result display unit 66, the contents 67A of the selected target document 66A are displayed on a preview screen 67 in the display format corresponding to the highest language ability (Kanji characters).

Figure 16:
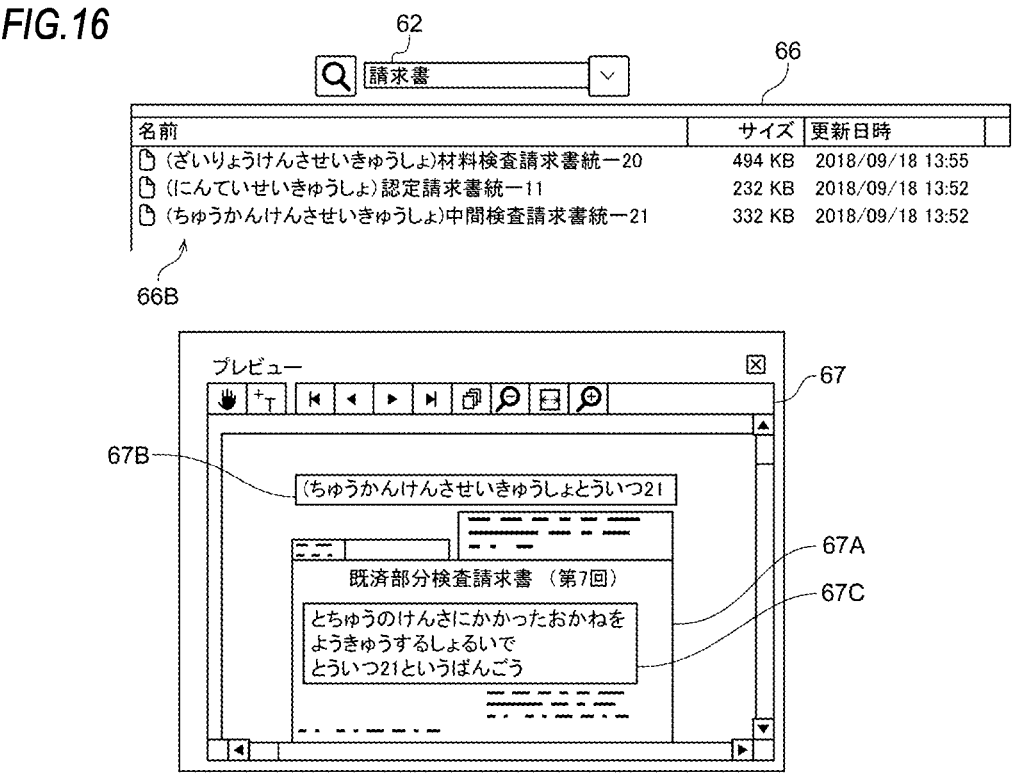
FIG. 16 is a view illustrating an example in which the document search results are displayed on the display screen in a display format according to the language ability.

FIG. 16 illustrates an example in which document search results are displayed on the display screen of the display device 60 in a display format corresponding to a language ability of the searcher.

FIG. 16 illustrates a case in which the language ability of the searcher is at a level where one understands hiragana characters and easy-to-understand Japanese.

When the search term "請求書" is input to the search box 62, documents including the search team "請求書" are searched for in the document storage of the database 20 and the document search results are displayed on the document search result display unit 66 in a display format in which furigana in hiragana characters is given to Kanji characters.

Therefore, even a searcher whose language ability is not high can select a target document 66B from the document search results.

When an operation of selecting the target document 66B is performed on the document search result display unit 66, the contents 67A of the selected target document 66B are displayed on the preview screen 67 in a display format 67B in which Kanji characters are converted into hiragana characters and in a display format 67C in which Kanji characters are converted into easy-to-understand Japanese.

The preview screen 67 may be omitted.

FIG. 17A illustrates a case in which the language ability of the searcher is at a level where one understands hiragana characters.

When the search term " 請求書 " is input to the search box 62, documents including the search term " 請求書 " are searched for in the document storage, and document search results are displayed on the document search result display unit 66 in a display format in which furigana in hiragana characters is given to Kanji characters.

Therefore, even a searcher whose language ability is not high can select the target document 66B from the document search results.

FIG. 17B illustrates a case in which document search results are displayed in a display format corresponding to a Japanese language test passing grade of the searcher. In this case, the language ability of the searcher is at a level where one understands Kanji characters that the one has already learned at the passing grade or lower grades, and understand Kanji characters that are not covered by the passing grade or lower grades if those Kanji characters are converted into hiragana characters.

When the search term " 請求書 " is input to the search box 62, documents including the search term " 請求書 " are searched for in the document storage, and the document search results are displayed on the document search result display unit 66 in a display format in which (i) Kanji characters that one has already been learned at the passing grade or lower grades remain as Kanji characters, and (ii) Kanji characters that are not covered by the passing grade or lower grades are converted into hiragana characters.

Therefore, even a searcher whose language ability is not high can select a target document 66C from the document search results.

FIG. 17C illustrates a case in which document search results are displayed in a display format corresponding to a Japanese language test passing grade of the searcher. In this case, the language ability of the searcher is at a level where one does not understand even hiragana characters, but understands Japanese texts if the Japanese texts are converted into Roman characters.

When the search term " 請求書 " is input to the search box 62, documents including the search term " 請求書 " are searched for in the document storage, and the document search results are displayed on the document search result display unit 66 in a display format in which the document search results are converted into Roman characters.

Therefore, even a searcher whose language ability is not high can select a target document 66D from the document search results.

Document search results may be displayed according to a work of the searcher. For example, among terms included in the document search results, terms related to the work, such as technical terms and work-specific terms, may be displayed in a display format corresponding to a level higher than a level of a language ability of the searcher (for example, the highest language ability level). Hereinafter, descriptions will be made with reference to FIG. 10.

The work information acquisition unit 15 reads the work information such as the information on the past works in which the searcher is involved (the history of works which are assigned to the searcher), the information on the process of the work being currently performed by the searcher (the information on the progress degree of the process being currently performed), and the technical terms defined in each process, from the work information storage of the database 20.

Among the terms included in the document search results, technical terms and work-specific terms to be displayed in a display format corresponding to a language ability higher than the language ability of the searcher (for example, the highest language ability) are determined based on the work information, for example, in the following manner.

(When the Same Work is Assigned 0 Times in the Past)

As illustrated in FIG. 10, when a current work process of the searcher is "工事着手 時 ", "工事", "統一 ", and "屆 " are technical terms defined in the process.

When the same work is assigned to the searcher 0 times in the past, the terms "工事 ", "統一 ", and "屆 " are terms that the searcher has not experienced before. Therefore, the terms " 工事 ", "統一 ", and "屆 " are displayed in the display format corresponding to the language ability of the searcher (for example, a display format in which the document search results are converted into hiragana characters), similar to the other terms.

As illustrated in FIG. 10, when the current work process of the searcher is "工事施工 時 ", " 工事 ", "統一 ", "屆 ", and "報告 " are technical terms defined in the process.

When the same work is assigned to the searcher 0 times in the past, the term "報告 ", is a term that the searcher has not experienced before. However, the terms " 工事 ", "統一 ", and " 屆 " are terms that the searcher experiences in the process of " 工事着手時 " in the past. Therefore, the term "報告 " is displayed in the display format corresponding to the language ability of the searcher (for example, a display format in which the document search results are converted into hiragana characters), similar to other terms. On the other hand, the terms "工 事 ", "統一 ", and "屆 " are displayed in a display format (for example, Kanji characters) corresponding to a language ability higher than the language ability of the searcher (for example, the highest language ability).

As illustrated in FIG. 10, when the current work process of the searcher is "工事完了 時 ", " 工事 ", " 完了 ", and "屆 " are technical terms defined in the process.

When the same work is assigned to the searcher 0 times in the past, the term " 完了 " is a term that the searcher has not experienced before. On the other hand, the terms " 工事 " and "屆 " are terms that the searcher experiences in the processes of "工事着手時 " and "工事 施工時 " in the past. Therefore, the term "完了 " is displayed in the display format corresponding to the language ability of the searcher (for example, the display format in which the document search results are converted into hiragana characters), similar to other terms. On the other hand, the terms " 工事 " and "屆 " are displayed in a display format (for example, Kanji characters) corresponding to a language ability higher than the language ability of the searcher (for example, the highest language ability).

As illustrated in FIG. 10, when the current work process of the searcher is "工事完了 後 ", "計画 ", " 完了 ", "報告 ", and " 屆 " are technical terms defined in the process.

When the same work is assigned to the searcher 0 times in the past, the term "計画" is a term that the searcher has not experienced before. On the other hand, the terms "完了", "報告", and "届" are terms that the searcher experiences in the processes of "工事着手時", "工事施工時", and "工事完了時" in the past. Therefore, the term "計画" is displayed in the display format corresponding to the language ability of the searcher (for example, the display format in which the document search results are converted into hiragana characters), similar to other terms. On the other hand, the terms "完了", "報告", and "届" are displayed in a display format (for example, Kanji characters) corresponding to a language ability higher than the language ability of the searcher (for example, the highest language ability).

As illustrated in FIG. 10, "施工", "修繕", "工事", and "検査" are terms specific to the current work of the searcher.

When the same work is assigned to the searcher 0 times in the past, the terms "施工", "修繕", "工事", and "検査" are terms that the searcher has not experienced before. Therefore, the terms "施工", "修繕", "工事", and "検査" are displayed in the display format corresponding to the language ability of the searcher (for example, the display format in which the document search results are converted into hiragana characters), similar to other terms. After the searcher goes through the process "工事着手時", the term "工事" becomes a term that the searcher experiences in the past. Therefore, in each of the process of "工事着手時" and subsequent processes, the term "工事" is displayed in a display format (for example, Kanji characters) corresponding to a language ability higher than the language ability of the searcher (for example, the highest language ability).

(When the Same Work is Assigned Once or More in the Past)

The technical terms and the work-specific terms illustrated in FIG. 10 are terms that the searcher experiences in the past.

Therefore, when the same work is assigned to the searcher once or more in the past, the technical terms and the work-specific terms illustrated in FIG. 10 are displayed in a display format (for example, Kanji characters) corresponding to a language ability higher than the language ability of the searcher (for example, the highest language ability).

When the same work is assigned to the searcher once or more times in the past, as the number of times increases, the number of terms displayed in the display format (for example, Kanji characters) corresponding to the language ability higher than the language ability of the searcher (for example, the highest language ability) may be increased.

In addition, the longer the time period for which the searcher is involved in the work is, the more the terms may be displayed in the display format (for example, in Kanji characters) corresponding to the language ability (for example, the highest language ability) higher than the language ability of the searcher. For example, as the number of times the searcher experiences the same work increases, among terms used for file names, the number of terms to be displayed in the display format (for example, Kanji characters) corresponding to the language ability higher than the language ability of the searcher (for example, the highest language ability) may be increased.

In addition, the technical terms and the work-specific terms to be displayed in the display format (for example, Kanji characters) corresponding to the language ability higher than the language ability of the searcher (for example, the highest language ability) may be defined for each process and each work as illustrated in FIG. 10, or may be freely registered by the searcher on the display screen illustrated in FIG. 12.

For example, when terms "補修" and "材料" are registered on the display screen illustrated in FIG. 12, the terms "補修" and "材料" may be displayed in the display format (for example, Kanji characters) corresponding to the language ability higher than the language ability of the searcher (for example, the highest language ability).

In addition, when the searcher performs an operation of storing a file in the past, terms included in the file name may be displayed in the display format (for example, Kanji characters) corresponding to the language ability higher than the language ability of the searcher (for example, the highest language ability).

For example, even when the language ability level of the searcher is at a level where one understands hiragana characters, for the file which he/she stores in the past, the terms included in the file name may be displayed in the display format (for example, Kanji characters) corresponding to the language ability higher than the language ability of the searcher (for example, the highest language ability).

FIG. 18A illustrates an example in which document search results are presented according to selection of a test grade of a Japanese language test.

A button 68A for selecting the second grade of the Japanese language test, a button 68B for selecting the third grade of the Japanese language test, and a button 68C for selecting the fourth grade of the Japanese language test are provided on the display screen of the display device 60. The buttons 68A, 68B, and 68C constitute the language ability selection unit 16. According to an operation of selecting the button 68A, 68B, or 68C, an assistance level of the document search results is selected.

A document search result display unit 67 is provided near the buttons 68A, 68B, and 68C on the display screen of the display device 60.

When the Japanese language test passing grade that the searcher registers in advance is the third grade, the document search results are displayed on the document search result display unit 67 in a display format corresponding to the third grade of the Japanese language test. When the searcher wants to change the display format of the document search results, the searcher performs an operation of pressing the button 68A or 68C.

When the operation of pressing the button 68A is performed, the document search results are displayed on the document search result display unit 67 again in a display format corresponding to the second grade of the Japanese language test. When the operation of pressing the button 68C is performed, the document search results are displayed on the document search result display unit 67 again in a display format corresponding to the fourth grade of the Japanese language test.

In addition, when the operation of pressing the button 68B is performed, the document search results are returned to the display format corresponding to the third grade of the Japanese language test.

FIG. 18B illustrates an example in which document search results are presented according to a selection of hiragana characters, katakana characters, and Roman characters.

A button 68D for selecting hiragana characters, a button 68E for selecting katakana characters, and a button 68F for selecting Roman characters are provided on the display screen of the display device 60. The buttons 68D, 68E, and 68F constitute the language ability selection unit 16. According to an operation of selecting the button 68D, 68E, or 68F, an assistance level of the document search results is selected.

The document search result display unit 67 is provided near the buttons 68D, 68E, and 68F on the display screen of the display device 60.

When the language ability that the searcher registers in advance is at a level where one understands katakana characters, the document search results are displayed on the document search result display unit 67 in a display format in which the document search results are converted into katakana characters.

When the searcher wants to change the display format of the document search results, the searcher performs an operation of pressing the button 68D or the button 68F.

When the operation of pressing the button 68D is performed, the document search results are displayed on the document search result display unit 67 again in a display format in which the document search results are converted into hiragana characters. When the operation of pressing the button 68F is performed, the document search results are displayed on the document search result display unit 67 again in a display format in which the document search results are converted into Roman characters.

In addition, when the operation of pressing the button 68E is performed, the document search results are returned to the display format in which the document search results are converted into katakana characters.

Buttons 67A for instructing an output of voice are provided on the document search result display unit 67.

When an operation of pressing any of the button 67A is performed, the contents of the document search results displayed on the document search result display unit 67 are output as voice from a speaker.

The current language ability of the searcher may be updated so that the language ability of the searcher is set to the language ability selected with the buttons 68D, 68E, or 68F. For example, even when the language ability that the searcher registers in advance is at a level where one understands katakana characters, if the button 68D is selected, information is updated to indicate that the language ability of the searcher is at a level where one understands hiragana characters, and is stored in the language ability information storage of the database 20. Accordingly, at the next time, the language ability information acquisition unit 11 may acquire the information indicating that the language ability of the searcher is at the level where one understands hiragana characters, from the language ability information storage of the database 20.

In addition, in response to an operation of designating a document among the document search results, the document may be converted into a display format corresponding to the language ability of the searcher and displayed.

As illustrated in FIG. 18C, on the document search result display unit 67, the document search results are displayed in the display format (for example, Kanji characters) corresponding to the language ability higher than the language ability of the searcher (understand hiragana characters).

An operation of designating a file name among the document search results displayed on the document search result display unit 67 is performed by the input device 55 such as a mouse. Accordingly, the designated file name is converted into hiragana characters, and is displayed on, for example, a pop-up display unit 67B.

(Document Search Result Presentation Program)

Figure 19:
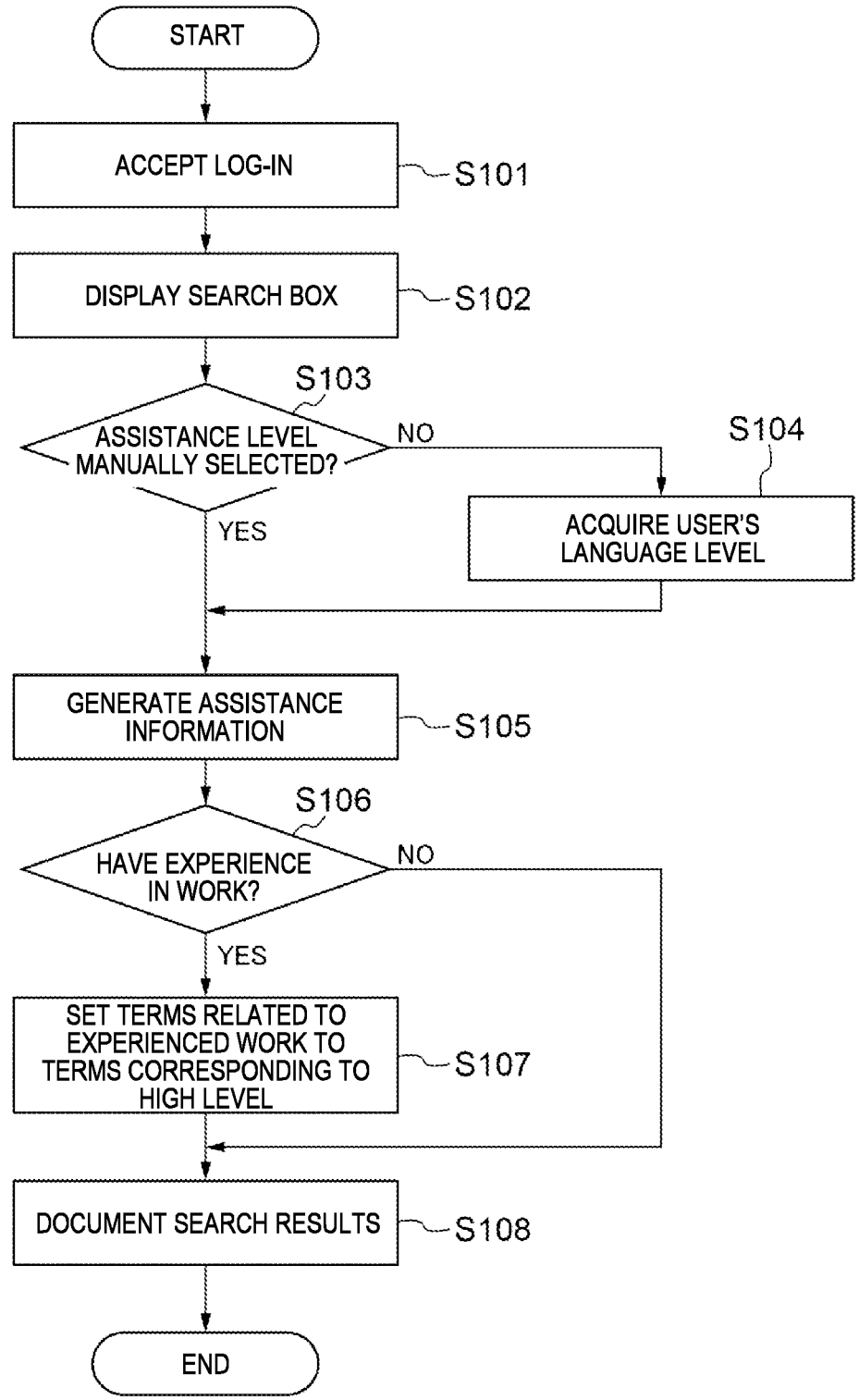
FIG. 19 is a flowchart illustrating an example of a process procedure according to the exemplary embodiment.

FIG. 19 is a flowchart illustrating an example of a process procedure according to the exemplary embodiment.

When an operation of starting search is performed, log-in is accepted (S101).

Next, the search box 62 is displayed on the display screen of the display device 60 (S102).

Next, it is determined whether an assistance level of the document search results has been manually selected (S103).

When it is determined that the assistance level of the document search results has not been manually selected (S103: NO), the procedure proceeds to S104. In S104, the language ability information acquisition unit 11 reads information indicating a language ability associated with the logged-in searcher from the language ability information storage of the database 20, and acquires the information indicating the language ability of the searcher (S104).

Next, based on the information indicating the language ability of the searcher, which is obtained in S104, assistance information is generated according to the language ability of the searcher (S105).

When it is determined that the assistance level of the document search results has been manually selected (S103: YES), the procedure proceeds to S105.

The assistance information is generated according to the selected language ability (S105).

Next, based on the work information acquired by the work information acquisition unit 15, it is determined whether the searcher has an experience in a work (S106).

When it is determined that the searcher has no experience in the work (S106: NO), the procedure proceeds to S108.

The document search results are presented in a presentation format corresponding to the language ability of the searcher. Terms related to the work, which are included in the document search results, are also presented in a presentation format corresponding to the language ability of the searcher (S108).

In S106, when it is determined that the searcher has an experience in the work (S106: YES), the procedure proceeds to S107.

It is determined that among terms included in the document search results, terms related to the work are to be displayed in a display format (for example, Kanji characters) corresponding to a language ability higher than the language ability of the searcher (for example, the highest language ability) (S107). The procedure proceeds to S108.

The assistance information generated in S105 is presented as it is (that is, without changing a display format) or the assistance information is presented in the display format determined in S107 when the procedure goes through S107 (S108).

The above-described process may also be implemented by a dedicated hardware circuit. In this case, the document search result presentation program may be executed by a single hardware circuit or plural hardware circuits.

In addition, a program that operates the document search result presentation apparatus 10 may be provided by a computer-readable recording medium such as a universal serial bus (USB) memory, a flexible disc, or a compact disc read only memory (CD-ROM), or may be provided on-line via a network such as the Internet. In this case, the program recorded in the computer-readable recording medium is generally transmitted to a memory, a storage, or the like and is stored. In addition, the program may be provided as, for example, single application software, or may be embedded as one function of the document search result presentation apparatus 10 in software of the apparatus.

In the above-described example, a determination is made using a Japanese language test passing grade of a searcher as a method for measuring a Japanese language ability. The method for measuring a Japanese language ability is not limited to the above-described method. Also, an application target of the invention is not limited to Japanese language. The invention is applicable to any language if display contents is changeable according to an evaluation result of a language ability. The evaluation may be made through a test or may be made by another person (for example, a teacher or a friend). Alternatively, an evaluatee may evaluate him/herself. The evaluation result may be a result indicating a comprehensive language ability or a result obtained by evaluating a particular aspect of a language ability (for example, reading or vocabulary). The evaluation result is represented in score, a grade, a level, or Pass/Fail.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A search result presentation apparatus comprising:
   a processor, configured to:
   acquire language ability information indicating a language ability of a searcher in a first language, wherein the language ability in the first language comprises a plurality of proficiency levels;
   receive a search term inputted by the searcher;
   acquire search results as a result of execution of a process of searching for a content that includes the received search term;
   in response to the language ability of the searcher in the first language being in a first proficiency level, display the search results using first characters; and
   in response to the language ability of the searcher in the first language being in a second proficiency level different from the first proficiency level, display the search results using second characters, wherein the first characters and the second characters are different representations of the first language with the same meaning.

2. The search result presentation apparatus according to claim 1, wherein the processor is further configured to:
   acquire work information indicating a work of the searcher, wherein
   the processor displays a term related to the work of the searcher, which is indicated by the acquired work information among terms included in the search results corresponding to a language ability higher than the language ability of the searcher, which is indicated by the acquired language ability information.

3. The search result presentation apparatus according to claim 2, wherein
   the processor acquires work information on a past work in which the searcher is involved, and
   the processor displays a term related to the past work, which is indicated by the acquired work information among the terms included in the search results corresponding to the language ability higher than the language ability of the searcher, which is indicated by the acquired language ability information.

4. The search result presentation apparatus according to claim 3, wherein
   the processor acquires the search results such that the longer a time period for which the searcher is involved in the work is or the more the number of times the searcher experiences the work is, the more terms are displayed in the search results corresponding to the language ability higher than the language ability of the searcher, which is indicated by the acquired language ability information.

5. The search result presentation apparatus according to claim 2, wherein
   the processor acquires work information on a file stored by the searcher, and the processor displays a term related to the file stored by the searcher, which is indicated by the acquired work information among the terms included in the search results corresponding to the language ability higher than the language ability of the searcher, which is indicated by the acquired language ability information.

6. The search result presentation apparatus according to claim 3, wherein
   the processor acquires work information on a file stored by the searcher, and
   the processor displays a term related to the file stored by the searcher, which is indicated by the work information among the terms included in the search results corresponding to the language ability higher than the language ability of the searcher, which is indicated by the acquired language ability information.

7. The search result presentation apparatus according to claim 4, wherein
   the processor acquires work information on a file stored by the searcher, and
   the processor displays a term related to the file stored by the searcher, which is indicated by the acquired work information among the terms included in the search results corresponding to the language ability higher than the language ability of the searcher, which is indicated by the acquired language ability information.

8. A non-transitory computer readable medium storing a program causing a computer to execute a search result presentation process comprising:
   acquiring language ability information indicating a language ability of a searcher in a first language, wherein the language ability in the first language comprises a plurality of proficiency levels;
   receiving a search term inputted by the searcher;
   acquiring search results as a result of execution of a process of searching for a content that includes the received search term;
   in response to the language ability of the searcher in the first language being in a first proficiency level, displaying the search results using first characters; and
   in response to the language ability of the searcher in the first language being in a second proficiency level different from the first proficiency level, displaying the search results using second characters, wherein the first characters and the second characters are different representations of the first language with the same meaning.

9. A search result presentation apparatus comprising:
   means for acquiring language ability information indicating a language ability of a searcher in a first language, wherein the language ability in the first language comprises a plurality of proficiency levels;
means for receiving a search term inputted by the searcher;
means for acquiring search results as a result of execution of a process of searching for a content that includes the received search term;
in response to the language ability of the searcher in the first language being in a first proficiency level, means for displaying the search results using first characters; and
in response to the language ability of the searcher in the first language being in a second proficiency level different from the first proficiency level, means for displaying the search results using second characters, wherein the first characters and the second characters are different representations of the first language with the same meaning.

* * * * *